US012669455B2

(12) United States Patent　　　　(10) Patent No.:　US 12,669,455 B2

Carrithers　　　　　　　　　　　　　(45) Date of Patent:　Jun. 30, 2026

(54) METHOD AND APPARATUS FOR DETERMINING WATER CONTENT OF HYGROSCOPIC FLUIDS

(71) Applicant: Brady Worldwide, Inc., Milwaukee, WI (US)

(72) Inventor: Adam D. Carrithers, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 316 days.

(21) Appl. No.: 18/611,808

(22) Filed: Mar. 21, 2024

(65) Prior Publication Data

US 2025/0297975 A1　　Sep. 25, 2025

(51) Int. Cl.
G01N 25/14　　　　(2006.01)

(52) U.S. Cl.
CPC .................................. G01N 25/145 (2013.01)

(58) Field of Classification Search
CPC .................................................... G01N 25/145
See application file for complete search history.

(56) References Cited

U.S. PATENT DOCUMENTS

| | | | | |
|---|---|---|---|---|
| 6,753,182 B1 * | 6/2004 | Kadkade | .................. | A01N 3/00 |
| | | | | 435/430 |
| 7,603,889 B2 * | 10/2009 | Cypes | ..................... | B01D 3/00 |
| | | | | 73/61.79 |
| 9,016,821 B2 | 4/2015 | Masuda et al. | | |

| | | | | |
|---|---|---|---|---|
| 9,869,651 B2 | 1/2018 | Akinwande et al. | | |
| 11,040,527 B2 * | 6/2021 | Jackson | ............... | B41J 2/04503 |
| 11,117,374 B2 | 9/2021 | Nakagawa et al. | | |
| 11,291,200 B2 * | 4/2022 | Guo | ........................ | A01N 1/125 |
| 11,491,780 B2 * | 11/2022 | Jackson | ............... | B41J 2/04581 |
| 11,768,215 B2 * | 9/2023 | Anderson, Jr. | ....... | B01L 3/0268 |
| | | | | 422/63 |
| 11,933,704 B2 * | 3/2024 | Anderson, Jr. | ........ | B41M 5/007 |
| 2005/0158699 A1 * | 7/2005 | Kadkade | ............... | A01N 1/125 |
| | | | | 435/411 |
| 2007/0247503 A1 | 10/2007 | Fukawa et al. | | |
| 2012/0184037 A1 * | 7/2012 | Schilffarth | ............ | B01L 3/5085 |
| | | | | 436/43 |
| 2015/0307403 A1 | 10/2015 | Takeuchi et al. | | |
| 2018/0200720 A1 * | 7/2018 | Ramsey | ................. | C07K 14/27 |
| 2018/0272345 A1 * | 9/2018 | Higuchi | ............. | B01L 3/50273 |
| 2020/0217764 A1 * | 7/2020 | Deboard | ............... | G01N 1/312 |

(Continued)

FOREIGN PATENT DOCUMENTS

SU　　　　　1144673 A1 * 3/1985

OTHER PUBLICATIONS

Havemeyer, "Freezing Point Curve of Dimethyl Sulfoxide—Water Solutions" Journal of Pharmaceutical Sciences, vol. 55, Issue 8, pp. 851-853 (Year: 1966).*

(Continued)

*Primary Examiner* — John Fitzgerald

(74) *Attorney, Agent, or Firm* — Brianna Schonenberg

(57)　　　　　　　ABSTRACT

A fluid dispensing device and method for adjusting an amount of hygroscopic fluid dispensed to an analytical substrate by a fluid ejection cartridge. The fluid dispensing device includes a fluid droplet ejection head disposed on a fluid cartridge containing a hygroscopic fluid; and a hygroscopic fluid cooler configured to determine a freezing point of the hygroscopic fluid.

11 Claims, 6 Drawing Sheets

(56) References Cited

U.S. PATENT DOCUMENTS

| | | | | |
|---|---|---|---|---|
| 2022/0145133 A1* | 5/2022 | Li | ............................ | C09G 1/04 |
| 2025/0297975 A1* | 9/2025 | Carrithers | ............ | G01N 25/145 |
| 2025/0305936 A1* | 10/2025 | Carrithers | .......... | G01N 35/1009 |

OTHER PUBLICATIONS

Lovelock et al. "Prevention of Freezing Damage to Living Cells by Dimethyl Sulfoxide" Nature vol. 183, No. 4672, pp. 1394-1395 (Year: 1959).*
Rockinger et al. "DMSO as new, counterintuitive excipient for freeze-draying human keratinocytes" European Journal of Pharmaceutical Sciences 160 (2021) 105746, pp. 1-11 (Year: 2021).*

* cited by examiner

METHOD AND APPARATUS FOR DETERMINING WATER CONTENT OF HYGROSCOPIC FLUIDS

TECHNICAL FIELD

The disclosure is directed to determining the water content of hygroscopic fluids used for analytical techniques, and in particular to a method and apparatus to accurately determine the water content of hygroscopic fluids.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

In a typical medical application, hygroscopic solvents and fluids such as dimethyl sulfoxide (DMSO) are often used in analytical instruments and in drug delivery due to its ability to solubilize both polar and nonpolar compounds. DMSO is miscible in a wide range of organic solvents, as well as water, and has a high boiling and freezing point. However, DMSO is highly hygroscopic, which is detrimental to the research for which it is used. For example, samples containing only 5 wt. % water in DMSO can negatively affect the stability of many drugs. When DMSO is used with automated analytical instruments, the amount of water in the DMSO can significantly affect accurate dispensing of test fluids to wells of a micro-well plate.

A common method used to determine the water content of DMSO is via a Karl Fischer titration (KFT) technique. KFT methods, either volumetric or coulometric, involve the generation of iodine in direct proportion to the amount of water present in the reaction. However, when analyzing DMSO, the DMSO is reduced by iodine in the Karl Fischer solvent to toxic dimethyl sulfide. The iodine thus released reacts again in the Karl Fisher solvent with the DMSO. Accordingly, due to the side reaction of DMSO with iodine, only small sample sizes can be analyzed before it is necessary to change the Karl Fisher solvent. Acoustic techniques may also be used to reproducibly measure water of hydration in microplates and storage tubes. However, the acoustic method requires good coupling between a piezo-electric transducer and the source vessel.

In all of the methods discussed above, the process for determining the water content of hygroscopic fluids is complex and/or requires the use of expensive equipment to perform the analysis. Accordingly, what is needed is an inexpensive method that is capable of quickly, conveniently, and accurately determining the water content of hygroscopic fluids used for analytical purposes.

In view of the foregoing, embodiments of the disclosure provide a fluid dispensing device and method for adjusting an amount of hygroscopic fluid dispensed to an analytical substrate by a fluid ejection cartridge. The fluid dispensing device includes a fluid droplet ejection head disposed on a fluid cartridge containing a hygroscopic fluid; and a hygroscopic fluid cooler configured to determine a freezing point of the hygroscopic fluid.

In another embodiment, the disclosure provides a method for adjusting an amount of hygroscopic fluid dispensed to an analytical substrate by a fluid ejection cartridge containing the hygroscopic fluid. The method includes providing a fluid droplet ejection system housed in a housing. The fluid droplet ejection system includes a fluid droplet ejection head disposed on a fluid cartridge containing a hygroscopic fluid. A cartridge translation mechanism is provided and configured to move the fluid droplet ejection head back and forth over an analytical substrate in an x-direction. A substrate translation mechanism is provided and configured to move the analytical substrate back and forth beneath the fluid droplet ejection head in a y-direction orthogonal to the x-direction. A hygroscopic fluid cooler is disposed in the housing and is configured to determine a freezing point of the hygroscopic fluid. A sample of the hygroscopic fluid is dispensed into the hygroscopic fluid cooler using a pipette or syringe and cooled to a freezing point of the hygroscopic fluid to provide a frozen hygroscopic fluid. Based on the freezing point of the hygroscopic fluid, a water content of the hygroscopic fluid is determined. An amount of hygroscopic fluid to dispense to the analytical substrate from the fluid droplet ejection head is automatically adjusted based on the water content of the hygroscopic fluid.

In another embodiment, the disclosure the hygroscopic fluid cooler includes an insulated vessel having a removable plug, a thermocouple disposed through the removable plug, and a thermoelectric cooler configured to cool the hygroscopic fluid to the freezing point of the hygroscopic fluid and configured to heat the hygroscopic fluid to above the freezing point of the hygroscopic fluid.

In another embodiment, software is disposed in a memory of the fluid dispensing device, wherein the software is configured to receive the freezing point of the hygroscopic fluid from the thermocouple, determine a water content of the hygroscopic fluid from the freezing point of the hygroscopic fluid, and adjust an amount of hygroscopic fluid dispensed by the fluid droplet ejection head based on the water content of the hygroscopic fluid.

In another embodiment, the hygroscopic fluid is dimethyl sulfoxide.

In another embodiment, a cartridge translation mechanism in the fluid dispensing device is configured to move the fluid droplet ejection head back and forth over an analytical substrate in an x-direction; and a substrate translation mechanism is configured to move the analytical substrate beneath the fluid droplet ejection head in a y-direction orthogonal to the x-direction.

In some embodiments, the analytical substrate is a micro-well plate or a glass slide.

In another embodiment, the hygroscopic fluid cooler is disposed on a rack and pinion slide that is configured to move the hygroscopic fluid cooler in a z-direction in the fluid dispensing device.

In another embodiment, the hygroscopic fluid cooler includes an insulated vessel having a removable plug, a thermocouple disposed through the removable plug, and a thermoelectric cooler configured to cool the hygroscopic fluid to a freezing point of the hygroscopic fluid.

In another embodiment, software is disposed in a memory of the fluid dispensing device, the freezing point of the hygroscopic fluid is sent from the thermocouple to the memory; and the software is used for determining a water content of the hygroscopic fluid from the freezing point of the hygroscopic fluid.

In another embodiment the frozen hygroscopic fluid is heated to above the freezing point of the hygroscopic fluid, and the hygroscopic fluid is recovered from the hygroscopic fluid cooler for dispensing to the analytical substrate.

In another embodiment, the hygroscopic fluid cooler is disposed on a rack and pinion slide configured for moving the hygroscopic fluid cooler in a z-direction in the housing, the rack and pinion slide is activated to move the hygroscopic cooler to a first position for inserting or removing the sample of hygroscopic fluid from the hygroscopic cooler and to a second position for cooling the hygroscopic fluid to the freezing point of the hygroscopic fluid.

An advantage of the foregoing embodiments is that the apparatus and method provide a simple, cost effective method for determining the water content of a hygroscopic fluid and for accurately dispensing a hygroscopic fluid to an analytical substrate.

DETAILED DESCRIPTION OF EXEMPLARY EMBODIMENTS

According to the following disclosure, there are provided an apparatus and method for accurately dispensing a hygroscopic fluid containing water to an analytical substrate. According to the disclosure, the weight percent of water in a hygroscopic fluid, i.e., a fluid that tends to absorb moisture from the atmosphere when exposed to an ambient atmosphere containing a moisture content is determined using the freezing point of the fluid. The disclosure is particularly directed to dimethyl sulfoxide (hereinafter referred to as "DMSO"). However, the application is not limited to determining the water content of DMSO, as the disclosure may also be used to determine the water content of other fluids, including but not limited to, methanol, isopropanol, ethanol, glycerol, acetone, pyridine, tetrahydrofuran, acetonitrile, and dimethylformamide.

Figure 1:
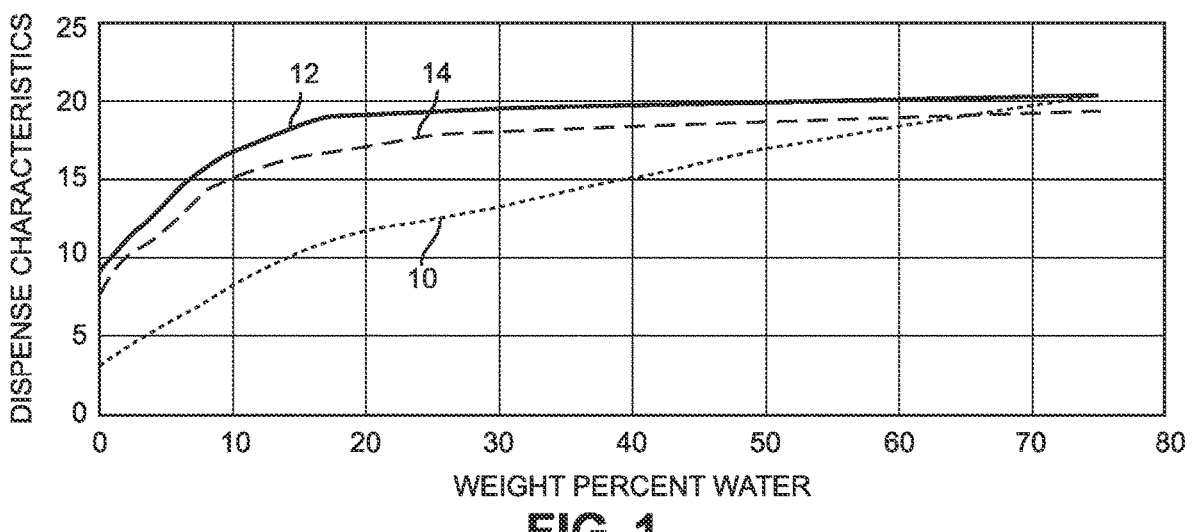
FIG. 1 is a graphical representation of a relationship between observed fluid dispense characteristics and a weight percent water in a hygroscopic fluid.

It is evident that the water content in the DMSO can significantly alter the volume of fluid delivered, and how fast the fluid reaches the substrate. Fluid dispensing parameters for hygroscopic solvents are typically set based on the characteristics of the anhydrous solvent. Dispensing parameters are thus not optimized for the water content of a hygroscopic fluid. FIG. 1 is a graphical representation of fluid dispense characteristics for a cartridge containing DMSO/water solutions from 0 to 80 wt. % water in the DMSO solution. Line 10 represents the velocities in meters per second (m/s) of fluid droplets based on the water content of the DMSO. Line 12 represents the mass of fluid droplets in nanograms (ng) dispensed based on the water content of the DMSO solution. Line 14 presents the volume in picoliters (pL) dispensed based on the water content of the DMSO solution. As shown in FIG. 1, line 14, the volume of a DMSO/water solution dispensed over the range of 0 to about 40 wt. % water reaches a plateau at approximately 19 pL, when using anhydrous DMSO firing parameters. An aqueous solution (100 wt. % water) dispensed from the same fluid ejection cartridge using aqueous firing conditions would yield approximately 23 pL.

Figure 2A:
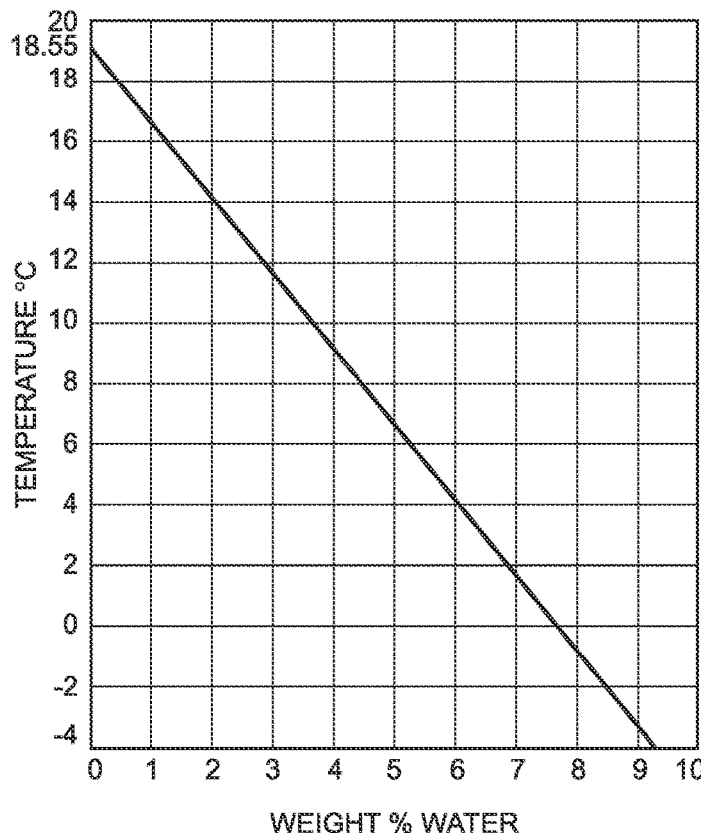
FIGS. 2A-2C are graphical representations of the freezing point of a DMSO/water solution over a range of weight percent water in the DMSO.
Figure 2B:
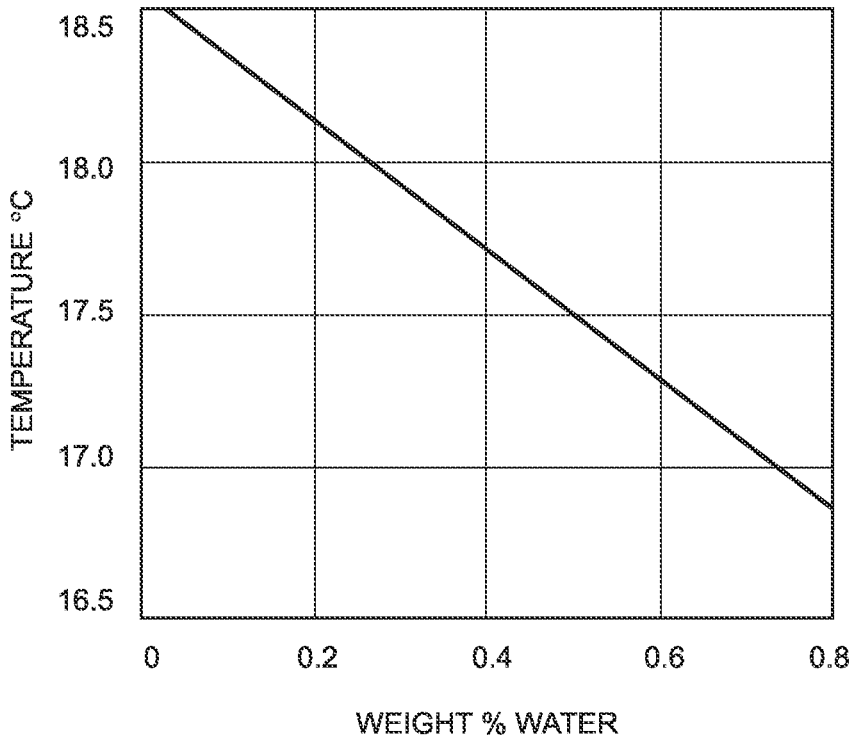

It is known that the water content of a binary DMSO and water solution can be determined by the freezing temperature of the fluid. Anhydrous DMSO has a relatively high freezing temperature, and even at low water concentrations it is not difficult to reach the temperatures necessary to achieve freezing. Plots of the freezing point of DMSO water solutions have been provided by Gaylord Chemical Company LLC of Covington, Louisiana as shown in FIGS. 2A and 2B.

Figure 2C:
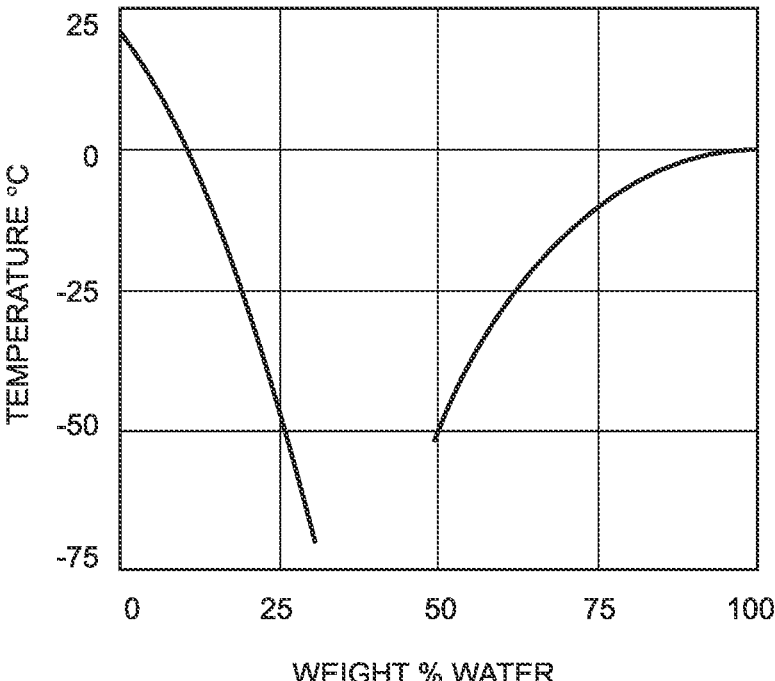
Figure 3:
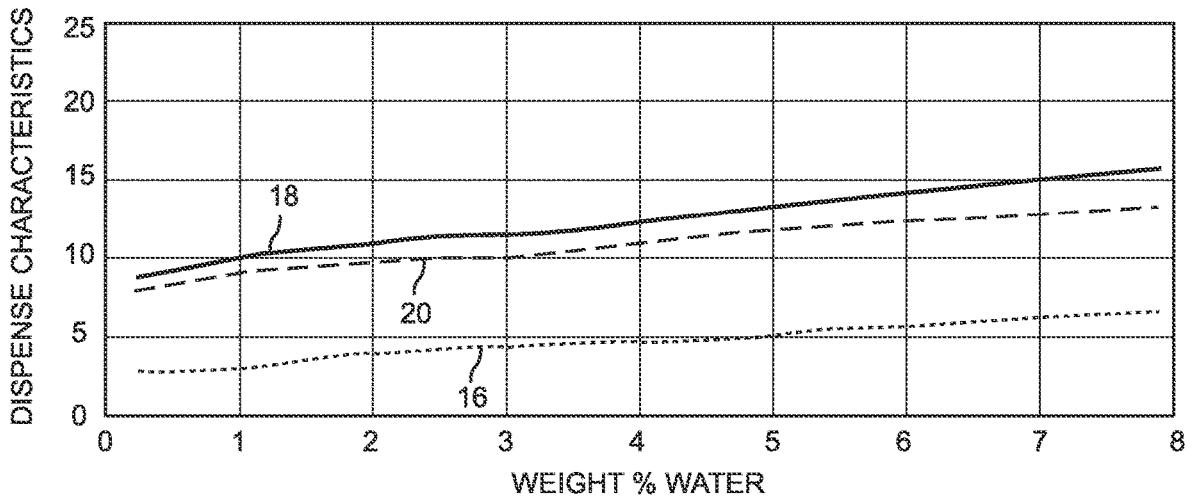
FIG. 3 is a graphical representation of a relationship between observed fluid dispense characteristics and a weight percent water in a hygroscopic fluid.
Figure 4:
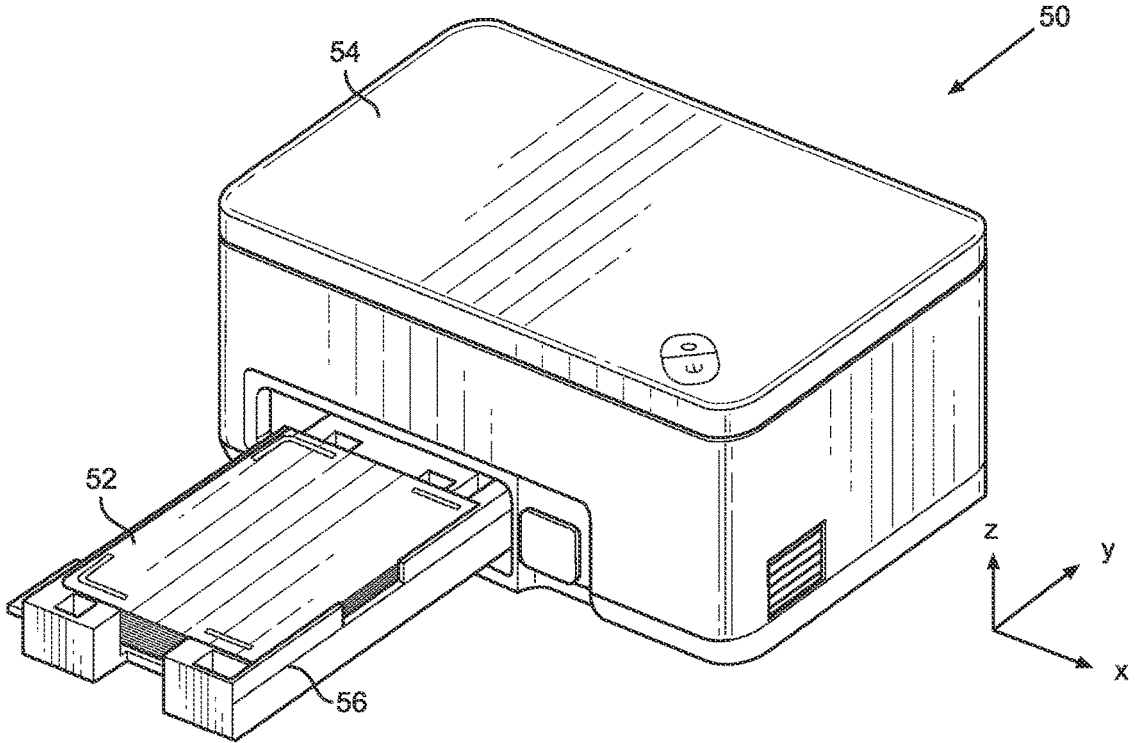
FIG. 4 is a perspective view, not to scale, of a fluid dispensing device according to an embodiment of the disclosure.

As shown in FIG. 2C, the freezing temperature of DMSO/water solution is non-monotonic, and at approximately 7.7 weight percent water, the freezing temperature approaches 0° C., which is equivalent to that of pure water. It has been demonstrated that samples containing only 5 wt. % water in DMSO can negatively affect compound stability of many drugs. Since users will ideally be using DMSO with a water concentration of less than 5 wt. %, it is important to be able to identify the water concentration DMSO only up to about 7.7%, as this will be adequate for most analytical purposes. Accordingly, the following lookup table may be used to adjust the dispense characteristics of a DMSO/water solution based on the water content of the solution from 0 to about 8 wt. % water in the DMSO. FIG. 3 is a graphical representation of fluid dispense characteristics for a cartridge containing DMSO/water solutions from 0 to 8 wt. % water in the DMSO solution. The fluid droplet velocity (m/s) is illustrated by line 16, the droplet mass (ng) is represented by line 18 and the droplet volume (pL) is represented by line 20.

TABLE

| Weight % Water | Freezing Temp (° C.) | Volume (pL) | Velocity (m/s) |
|---|---|---|---|
| 0.2% | 18.1 | 8.3 | 3.4 |
| 1.0% | 16.5 | 9.5 | 3.5 |
| 2.0% | 14.0 | 10.2 | 4.6 |
| 4.0% | 9.1 | 11.6 | 5.4 |
| 7.7% | 0.0 | 14.2 | 6.8 |

The mass of the droplets in nanograms (ng) can be determined from the volume of the fluid and the specific gravity of the fluid. Interpolations can be used to find the weight percent water in the DMSO for freezing point data that falls between ranges in the above table.

With reference now to FIGS. 4-9, there is provided an illustration of a fluid dispensing device 50 for dispensing fluids onto an analytical substrate 52 such as a micro-well plate, glass slide, or other substrate used for analytical purposes. The device 50 includes a housing 54 that includes a mechanism for moving a fluid cartridge (not shown) back and forth over the analytical substrate 52 in an x-direction while the analytical substrate 52 is moved through the housing 54 in a y-direction by a substrate translation mechanism 56. Fluid from the fluid cartridge is dispensed to the analytical substrate 52 from an ejection head on the fluid cartridge.

Figures 5, 6:
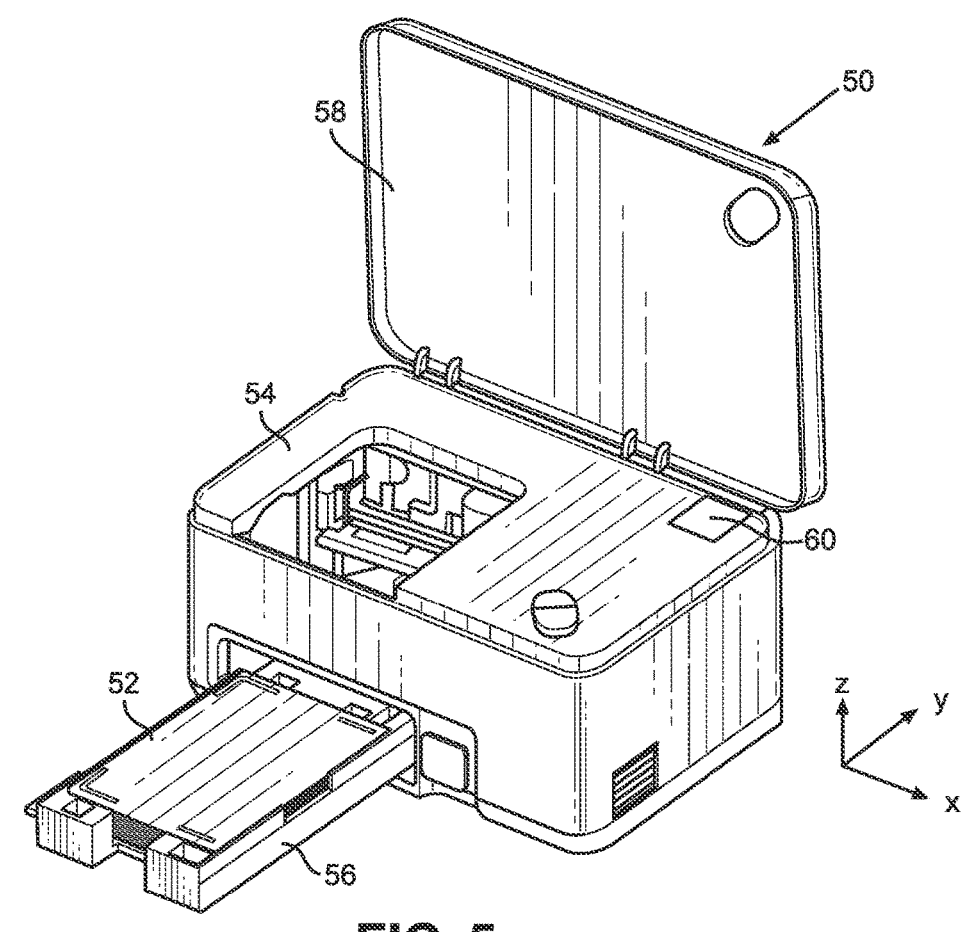
FIG. 5 is a perspective view, not to scale of the fluid dispensing device of FIG. 4 with a cover therefor in an opened positioned.
FIG. 6 is a perspective, cut-away view, not to scale of a portion of the fluid dispensing device of FIG. 5 showing a hygroscopic fluid cooler in a lowered position.

FIG. 5 illustrates a hinged cover 58 for the device 50 that may be opened to allow for fluid cartridge insertion and removal and to expose a sample port 60 that is used to determine the freezing point of a hygroscopic fluid. With reference to FIG. 6, disposed in the housing 54 below the sample port 60 is a hygroscopic fluid cooler 62 that is made of metal or other thermo- conductive material. The hygroscopic fluid cooler 62 may be used to determine the freezing point of a sample of hygroscopic fluid containing an unknown weight percent water. A thermocouple device 64 is attached to the hygroscopic fluid cooler 62 to provide measurement of the freezing point temperature of a sample of hygroscopic fluid within the hygroscopic fluid cooler 62. The thermocouple device 64 includes a thermocouple probe 66 that is inserted through a capping device 68 for the hygroscopic fluid cooler 62. The thermocouple probe 66 is easily replaceable as needed. The capping device 68 is configured to prevent additional moisture or water from entering the hygroscopic fluid to be tested. A fan 70 is also enclosed in the housing 54 to remove heat from the hygroscopic fluid cooler 62 as the hygroscopic fluid is cooled. Also included in the housing 54, is a motor 72 for a rack and pinion device 74 for raising and lowering the hygroscopic fluid cooler 62 disposed on a slide 76 in a z-direction.

Figure 7:
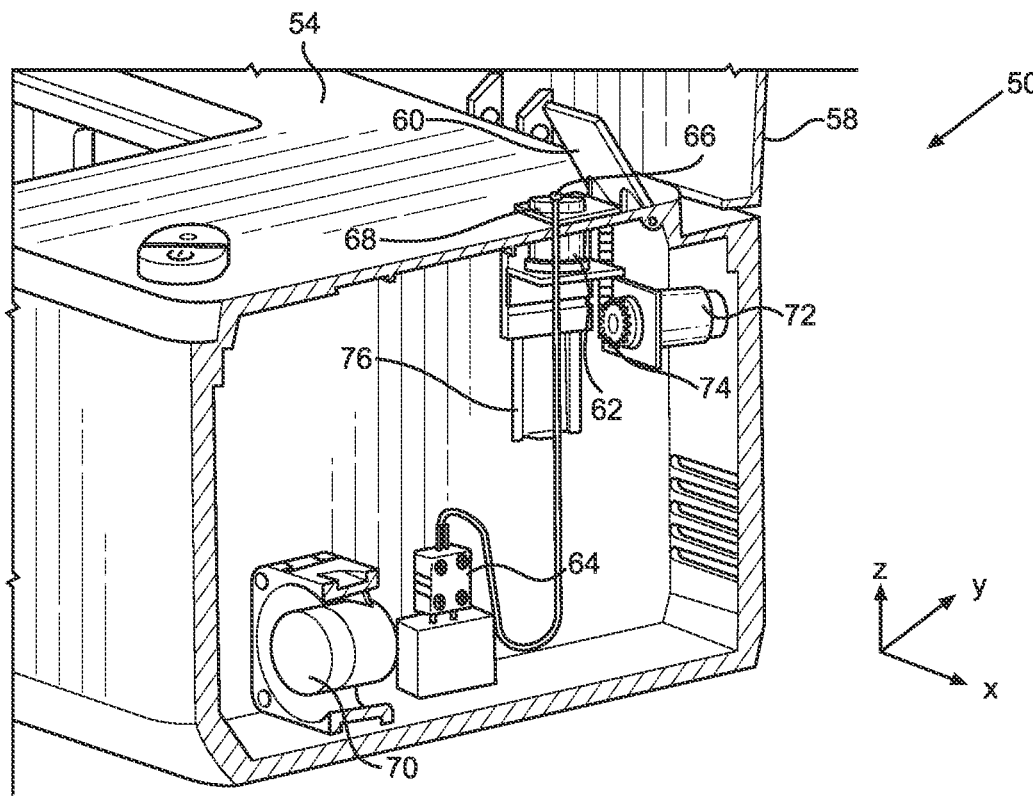
FIG. 7 is a perspective, cut-away view, not to scale of a portion of the fluid dispensing device of FIG. 5 showing a hygroscopic fluid cooler in a raised position.
Figure 8:
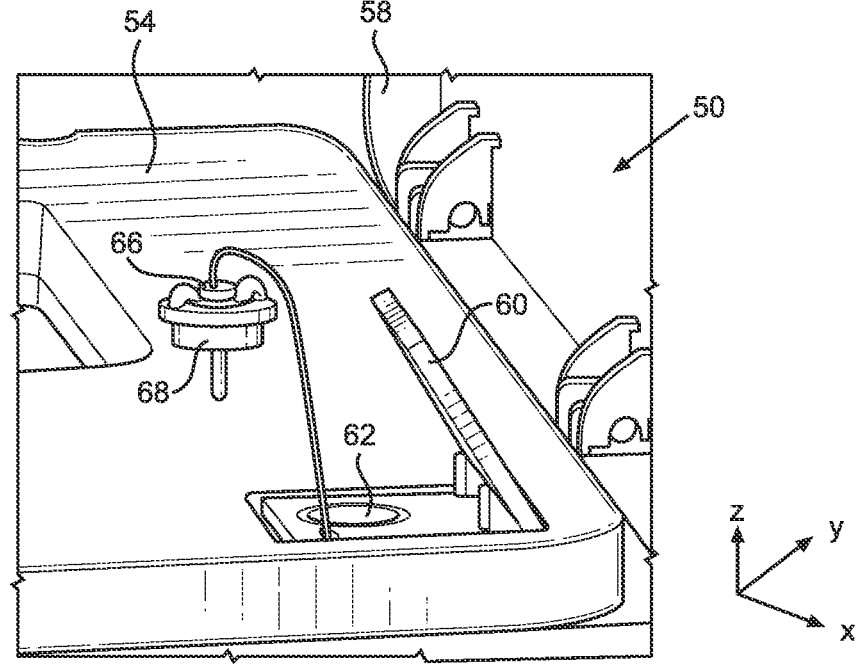
FIG. 8 is a perspective, partial view, not to scale, of the fluid dispensing device of FIG. 7 with a capping device and thermocouple probe removed from the hygroscopic fluid cooler.
Figure 9:
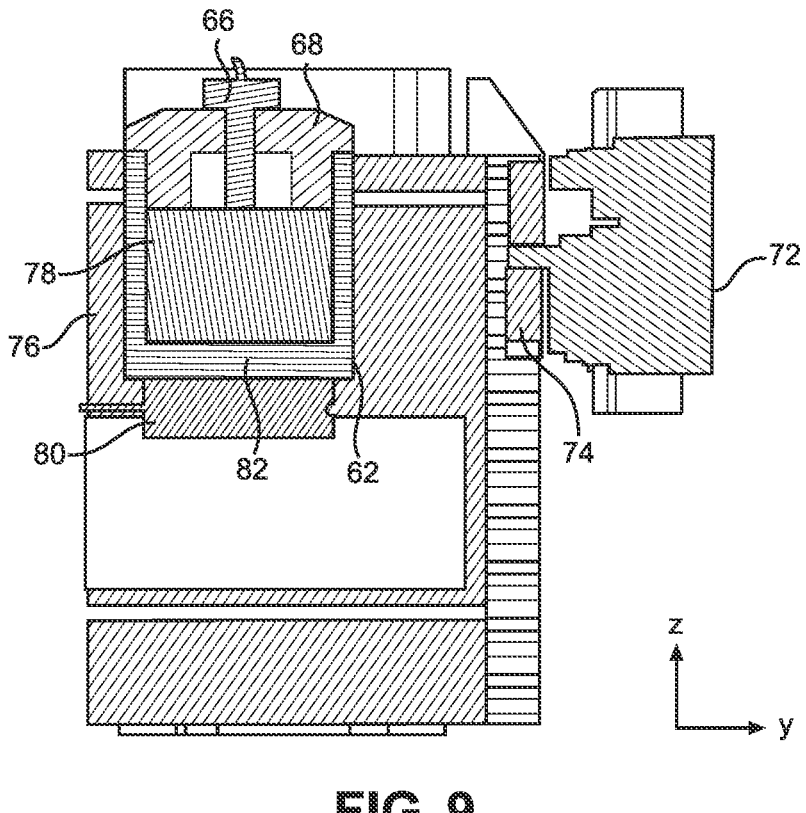
FIG. 9 is a cross-sectional view, not to scale of the hygroscopic fluid cooler for the fluid dispensing device of FIG. 4.

In FIG. 7, the motor 72 and rack and pinion device 74 are activated to raise and lower the hygroscopic fluid cooler 62 through the sample port 60 in the z-direction. In FIG. 8 the capping device 68 is removed from the hygroscopic fluid cooler 62 in order to insert or remove a sample of fluid from the cooler. In order to determining the freezing point of a hygroscopic fluid, a sample of fluid is placed into the hygroscopic fluid cooler 62 and the thermocouple probe 66 is inserted into the sample of fluid and the hygroscopic fluid cooler 62 is sealed with the capping device 68.

Further details of the hygroscopic fluid cooler 62 are illustrated in FIG. 8. The hygroscopic fluid cooler 62 is an insulated vessel that contains a sample 78 of a hygroscopic fluid to be tested. Ideally, the hygroscopic fluid cooler 62 is a reuseable vessel, however, disposable vessels may also be used. A thermoelectric cooler (TEC) 80 is disposed on the slide 76 so that the hygroscopic fluid cooler 62 sits atop of the TEC 80. The TEC 80 is a solid-state active heat pump which works using a Peltier effect. As an electrical current is passed between a junction of two dissimilar materials in the TEC 80, a heat flux is generated. Although TECs are not very efficient, the have the advantages of no noise, no vibration, no refrigerant, high reliability, and low weight. The TEC 80 may be the most cost-effective means by which to cool the sample and requires the least amount of space. However, in an alternative embodiment, it possible that a refrigerant system may be used to cool the sample of fluid rather than the TEC 80. If using a cooling system other than a TEC, resistive heaters may be included on or in proximity to the hygroscopic fluid cooler 62 to warm the fluid above the freezing point after the analysis is completed.

The thermocouple probe 66 inserted into the sample 78 is used to monitor the temperature of the sample 78 until the sample 78 was frozen. Upon activation, the TEC 80 removes heat from a bottom 82 of the hygroscopic fluid cooler 62 to cool the sample 78 of fluid to the fluid's latent heat of fusion. Cooling of the fluid 78 is continued until the entire sample 78 of fluid is frozen. Once the freezing point of the sample 78 has been determined, the current of the TEC 80 can be reversed to heat the sample 78, thereby quickly releasing the thermocouple from the frozen sample 78. The TEC 80 and thermocouple device 64 are in electrical communication with software in a memory of the fluid dispensing device 50. The software automatically identifies when the latent heat of fusion (freezing point) of the fluid is reached.

Figure 10:
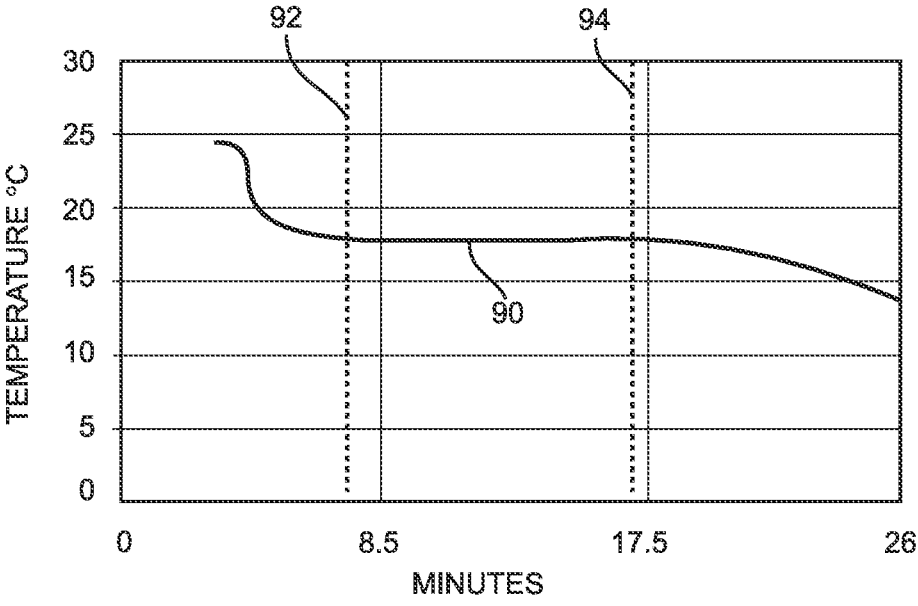
FIG. 10 is a graphical representation of a freezing curve temperature versus time for an anhydrous DMSO fluid.

As an illustrative, non-limiting example of the use of a method of freezing a sample of fluid, a 10-gram sample of anhydrous DMSO was placed into a glass vial with a thermocouple disposed into the sample. The vial containing the sample was placed into a freezer. As shown in FIG. 10, the sample of DMSO reached its freezing point of 18.55° C. after approximately 3 minutes as illustrated by line 90. The plateau of the latent heat of fusion of the DMSO between lines 92 and 94 continued until the entire sample was frozen, followed by a continued decrease of the sensible heat of the DMSO as shown in FIG. 10. The duration of the plateau is dependent on the amount of sample and the heat flux of the sample. Also, a higher water content may result in a longer time to reach the freezing point plateau. Ideally, the sample would be from a large stock of hygroscopic fluid and could be disposed of after analysis. However, sample of fluid may be recovered and reused after analysis, if necessary.

Once the freezing point temperature of the fluid is determined, the software in the memory uses a lookup table, similar to the above table for DMSO, or equation for the particular hygroscopic fluid to determine the optimal fluid dispensing parameters, average droplet size, and velocity of the fluid droplets for the fluid ejection head being used in the fluid dispensing device 50. The dispense location on the analytical substrate and droplet count may be adjusted by the software to ensure that the fluid droplets are placed correctly onto the substrate in the desired amount.

Referring again to FIG. 3, fluid dispensing characteristics change dramatically over a range of water content of from about 0 to about 8 wt. % as described above. In the foregoing range of, there is approximately 100% change in velocity in meters per second of the fluid droplets (line 16) and 75% change in droplet volume in picoliters (line 20) or droplet mass in nanograms (line 18) for a particular fluid ejection head. For other fluid ejection heads dispensing the same fluid, the results may be even more dramatic.

For example, it is known that natural process variations during manufacturing of the fluid ejection head for a fluid ejection cartridge can result in variation of the delivered droplet mass and velocity. For the method described above, a standardization process may be included when using a cartridge having at least two fluid reservoirs. For instance, a first fluid reservoir may be filled with a standard jetting fluid which has been well characterized, and a second reservoir is filled with the hygroscopic fluid to be characterized. When the fluid ejection cartridge is placed into the testing apparatus described above, the standard fluid is tested first to determine the performance of the fluid ejection cartridge.

Then the results from dispensing the hygroscopic fluid can be fine-tuned based on the fluid cartridge dispensing characteristics, thereby increasing the accuracy of the water content determination.

It is known that the homogeneity of performance of a fluid ejection head is greater within the ejection head than across a set of fluid ejection heads; therefore, the preferred embodiment would have a single fluid ejection head in fluid-flow communication with at least two fluid reservoirs to two separate sets of fluid ejectors on the same fluid ejection head. One set of fluid ejectors is for the standard fluid and one set of fluid ejectors is for the hygroscopic fluid, where the performance of the of each set of ejectors is highly correlated to one another. It is, of course, possible to correlate the performance of two separate ejection heads rather than a single ejection head, which would provide an alternative embodiment.

It is also known that water or moisture may enter a standard fluid ejection cartridge through the nozzle holes of the ejection head, creating a heavily water-concentrated volume of hygroscopic fluid in the most critical regions of the fluid ejection head. To minimize water or moisture uptake through the nozzles, the fluid ejection cartridge may include a cover over the ejection head. The cover may either be removed manually by the user prior to inserting the fluid ejection cartridge into the test apparatus, or the cover may be automatically removed/retracted by the test apparatus. In an exemplary embodiment, the fluid ejection cartridge may have a spring-loaded cover over the ejection which is automatically retracted upon insertion of the fluid ejection cartridge into the testing apparatus. Upon removal from the apparatus, the cover automatically extends back into place over the ejection head thereby minimizing water uptake through the nozzles. The ejection head cover is especially useful in the method described above where a user weighs the fluid ejection cartridge instead of the volume of fluid dispensed.

In a self-contained fluid dispensing device 50 described above, it is further possible to limit the amount of water uptake by the hygroscopic fluid by introducing heavy, dry gases into a test chamber containing the device 50. For instance, argon or nitrogen may be used to displace moist air from the test chamber, thereby reducing the water uptake into the fluid ejection cartridge or fluid sample during testing.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid dispensing device comprising:
    a housing comprising
        a sample port; and
        a hygroscopic fluid cooler positioned below the sample port, wherein the hygroscopic fluid cooler is an insulated vessel comprising a hygroscopic fluid, the hygroscopic fluid cooler configured to determine a freezing point of the hygroscopic fluid.

2. The fluid dispensing device of claim 1, wherein the hygroscopic fluid comprises dimethyl sulfoxide.

3. The fluid dispensing device of claim 1, further comprising
    a removable capping device attached to the hygroscopic fluid cooler,
    a thermocouple device disposed through the removable capping device, and
    a thermoelectric cooler configured to cool the hygroscopic fluid in the hygroscopic fluid cooler to the freezing point of the hygroscopic fluid and configured to heat the hygroscopic fluid in the hygroscopic fluid cooler to above the freezing point of the hygroscopic fluid.

4. The fluid dispensing device of claim 3, further comprising software disposed in a memory of the fluid dispensing device, wherein the software is configured to receive the freezing point of the hygroscopic fluid from the thermocouple device and determine a water content of the hygroscopic fluid from the freezing point of the hygroscopic fluid.

5. The fluid dispensing device of claim 1, wherein the housing further comprises a substrate translation mechanism configured to move an analytical substrate in a y-direction.

6. The fluid dispensing device of claim 5, wherein the analytical substrate comprises a micro-well plate or a glass slide.

7. The fluid dispensing device of claim 1, wherein the hygroscopic fluid cooler is disposed on a rack and pinion slide configured for moving the hygroscopic fluid cooler in a z-direction in the fluid dispensing device.

8. The fluid dispensing device of claim 7, wherein the rack and pinion slide is configured to raise and lower the hygroscopic fluid cooler through the sample port in the z-direction.

9. A fluid dispensing device comprising:
    a housing comprising
        a sample port;
        a hygroscopic fluid cooler positioned below the sample port, wherein the hygroscopic fluid cooler is an insulated vessel comprising a hygroscopic fluid;
        a removable capping device attached to the hygroscopic fluid cooler,
        a thermocouple device disposed through the removable capping device and in contact with the hygroscopic fluid, the thermocouple device configured to provide measurement of a freezing point temperature of the hygroscopic fluid;

a thermoelectric cooler configured to cool the hygroscopic fluid in the hygroscopic fluid cooler to the freezing point of the hygroscopic fluid and configured to heat the hygroscopic fluid in the hygroscopic fluid cooler to above the freezing point of the hygroscopic fluid; and software disposed in a memory of the fluid dispensing device, the software in electrical communication with the thermocouple device and the thermoelectric cooler;

wherein the software is configured to receive the freezing point of the hygroscopic fluid from the thermocouple device and determine a water content of the hygroscopic fluid from the freezing point of the hygroscopic fluid.

10. The fluid dispensing device of claim 9, wherein the hygroscopic fluid cooler and the thermoelectric cooler are disposed on a rack and pinion slide; and the rack and pinion slide is configured to move the hygroscopic fluid cooler and the thermoelectric cooler in a z-direction in the fluid dispensing device.

11. The fluid dispensing device of claim 10, wherein the housing further comprises a substrate translation mechanism configured to move an analytical substrate in a y-direction orthogonal to the z-direction.

* * * * *